Nov. 28, 1961  J. MADSEN ET AL  3,010,337
VEHICLE TRANSMISSION SHIFT CONTROLS
Filed Nov. 18, 1959  4 Sheets-Sheet 1

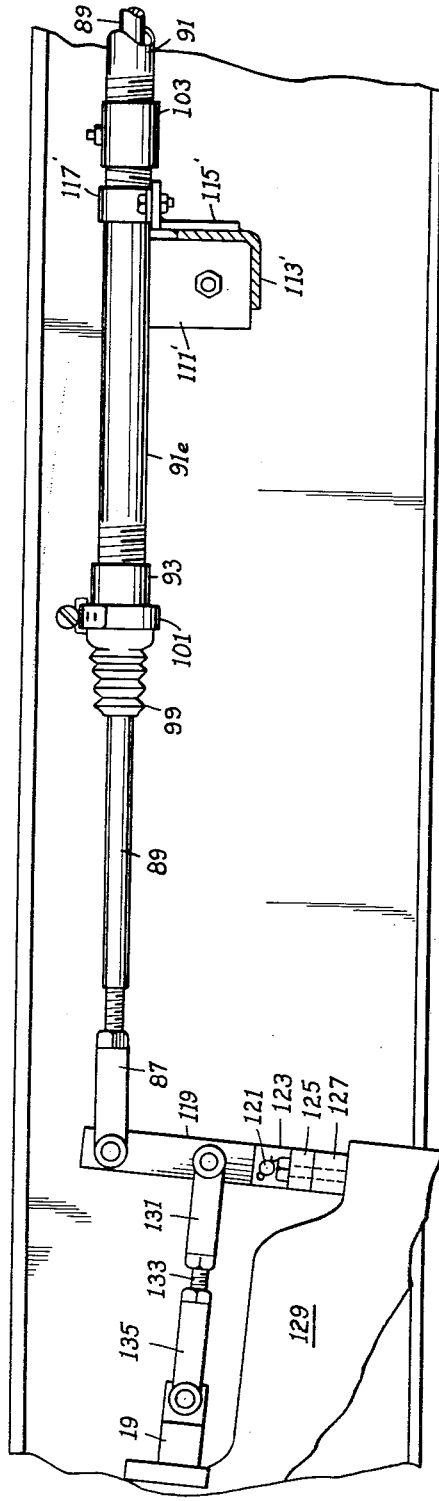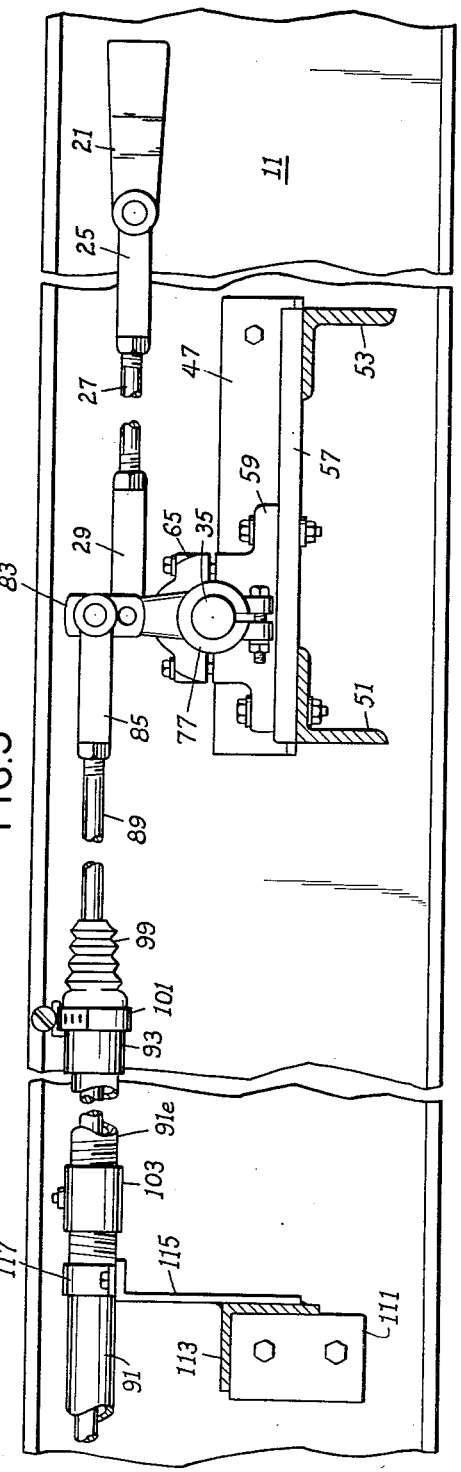
FIG.3
FIG.4

United States Patent Office 3,010,337
Patented Nov. 28, 1961

3,010,337
VEHICLE TRANSMISSION SHIFT CONTROLS
Jay Madsen and James J. Tydings, Bath, N.Y.; Sherman B. Shults and Steuben Trust Company, executors of said Jay Madsen, deceased
Filed Nov. 18, 1959, Ser. No. 853,782
5 Claims. (Cl. 74—473)

The present invention relates to transmission shift controls for a vehicle of the type having an operator manipulated gear changing device at one end of the vehicle and a transmission at the other end of the vehicle, the shift controls running generally longitudinally of the vehicle for interconnecting an actuating the transmission in response to manipulations of the gear changing device.

Prior transmission shift controls of this general type have been found to be disadvantageous in one respect or another. The disadvantages have become particularly apparent in winter, when road dirt and icing conditions affected one prior device with the result that the controls became inoperative due to either wear or icing or a combination of these. Another prior device, consisting of a flexible line enclosed in a flexible conduit or tube, was arranged such that air was admitted to the tube, the controls becoming inoperative due to freezing when condensation formed inside the tube as the ambient temperature and humidity changed. This control further had a "spongy" feel in shifting so that the operator was never really sure the transmission was engaged or disengaged. Another device using universal joints had the disadvantage that rotary motion was required to engage the gears. Thus it was possible for play in the joints to build up to the point where the operator used all available motion at the stick and still did not have sufficient motion at the transmission to shift properly.

An object of the present invention is to provide a generally improved and more satisfactory transmission shift control extending longitudinally from the front to a transmission at the rear of a vehicle which avoids the disadvantages referred to above.

Another object is the provision of a new and improved transmission shift control which is fully operative under severe winter conditions.

Yet another object is to provide a new and improved transmission shift control having exposed and unexposed portions, the exposed portions lying substantially forwardly or rearwardly of the axles where the dirt and icing conditions are not severe, the unexposed portions lying between the axles where these conditions may lead to inoperativeness.

A further object is the provision of a new and improved transmission shift control assembly which acts positively under all weather conditions in such a manner that motion imparted at one end of the control assembly is transmitted without a substantial degree of lost motion to the other end of the assembly.

These and other desirable objects may be attained in the manner disclosed as an illustrative embodiment of the invention in the following description and in the accompanying drawings forming a part hereof, in which:

FIG. 3 is an enlarged side elevational view of the rear assembly shown in FIG. 2, one of the rod and tube assemblies being omitted and a cross member being shown in section;

FIG. 4 is an enlarged side elevational view of the forward assembly shown in FIG. 1, the cross members being shown in cross section and one of the rod and tube assemblies having been omitted;

The same reference numerals throughout the several views indicate the same parts.

Figure 1:
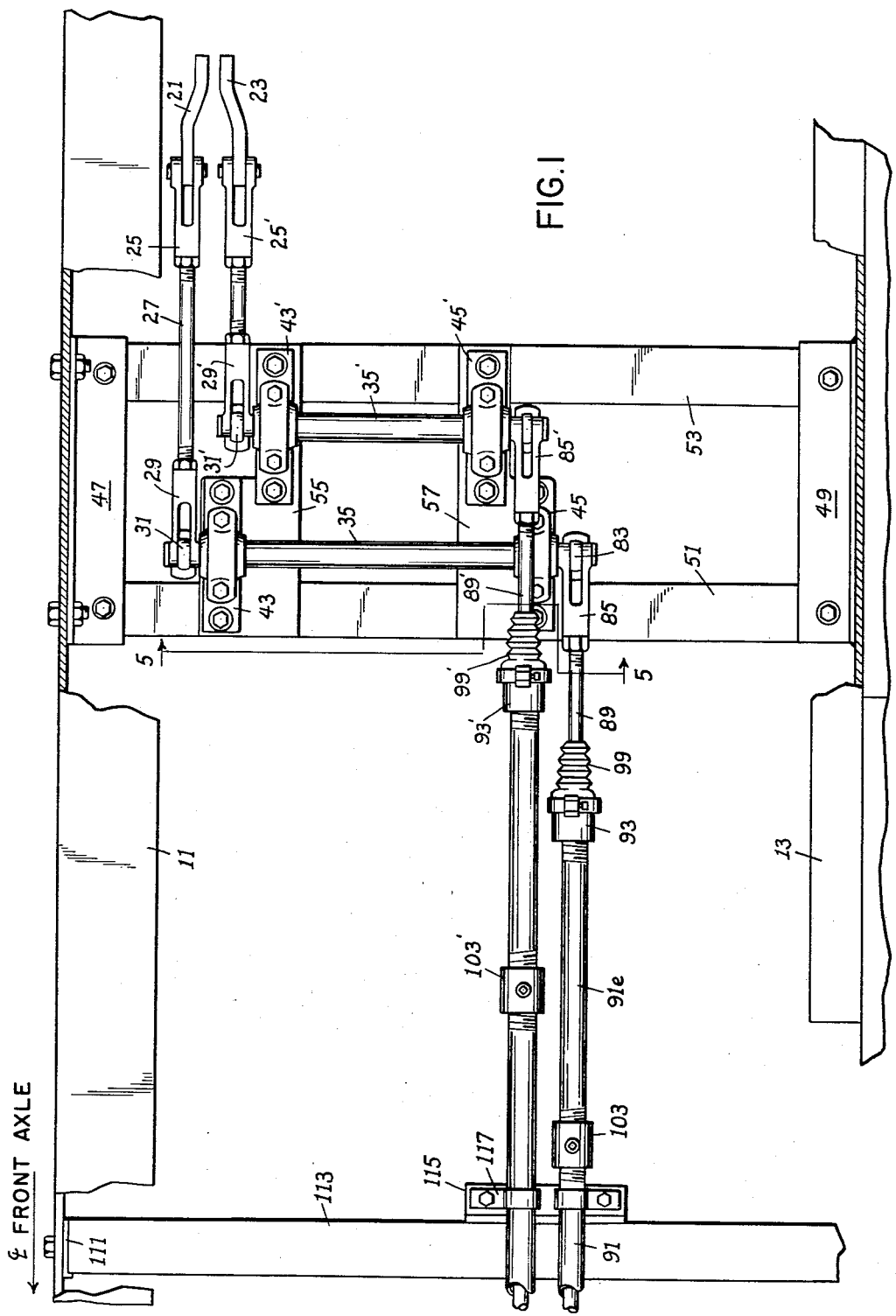
FIG. 1 is a top plan view of the shift control assembly according to the invention showing the portion forward of the front axle.

In FIG. 1 is illustrated fragmentarily the chassis of a vehicle, preferably a bus or truck, having a pair of longitudinally extending side members 11 and 13. In FIG. 1 is illustrated the portion of the chassis forwardly of the front axle, while in FIG. 2, the portion of the chassis rearwardly of the rear axle is illustrated, the center line of one axle being off of these views. Thus, in FIG. 2, the member 11 is a continuation of the member 11 shown in FIG. 1, while the member 13 has been omitted from FIG. 2.

Figure 2:
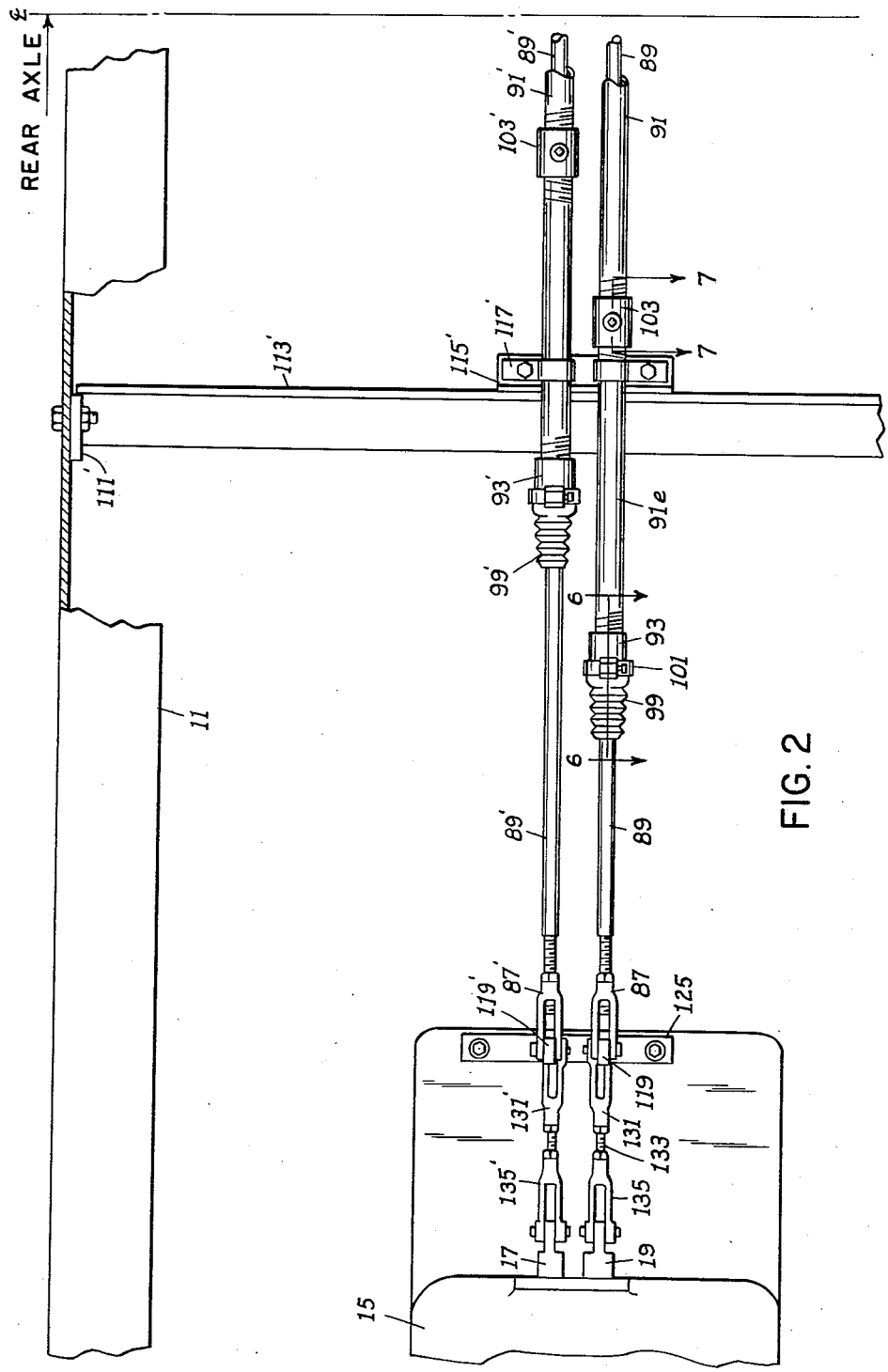
FIG. 2 is a view similar to FIG. 1 showing the portion rearwardly of the rear axle and connected to the transmission, an indefinite length of shift rod and surrounding tube between FIG. 1 and FIG 2 having been omitted.

The vehicle with which the present invention may be associated is the type having the transmission at one end of the chassis, and the driver operated gear changing device, commonly a gear stick, mounted at the other end of the chassis. The chassis illustrated in FIGS. 1 and 2 is intended for a vehicle having the engine at the rear. Consequently at the rear end of the chassis is suitably mounted by means not here shown a transmission 15 of any appropriate type for the vehicle in question. It may be noted that the transmission 15 as shown is mounted slightly off center to the right when looking toward the front of the chassis. The transmission 15 is of the type which is operated by manipulating two forwardly extending actuating members 17 and 19 of conventional kind, such as push rods movable longitudinally forwardly and rearwardly to various extents individually to produce the desired gear changes.

The gear shifting device to be operated manually by the driver while changing the gears of the vehicle is not shown in FIG. 1, since it may be of any suitable or conventional type. Most commonly a gear stick is provided having a conventional arrangement at its bottom for selectively engaging one or the other of two forwardly extending laterally curved actuating arms 21 and 23. The arms 21 and 23, it may be noted, are appropriately mounted at the left side of the chassis approximately below the area of the driver's seat.

The arms 21 and 23 operated by the driver manipulated gear shifting device are each operatively connected to one of the transmission actuating members 17 and 19 by means of a shift control assembly according to the present invention, so that actuating one of the arms 21 and 23 produces a corresponding movement of the corresponding one of the transmission actuating members 17 and 19. More specifically, the arm 21 is interconnected with the transmission actuating member 19, while the gear shift actuating arm 23 is interconnected with the transmission actuating member 17. Since the gear shifting device is located at the left hand side of the chassis at the front, while the transmission 15 is located at the rear off center at the other side of the chassis, the arm 21 is connected to a shift control assembly which extends rearwardly a short distance in front of the front axle, then laterally to the side to a point beyond the center line of the chassis, and thence rearwardly to a point beyond the rear axle to be connected with the transmission member 19. The arm 23 is connected to a shift control assembly which has parts parallel to the shift control assembly described, extending rearwardly, then laterally to the side, and then rearwardly again to be connected with the transmission member 17. The two shift control assemblies have similar parts and act in a similar manner, the dimensions of some of the parts merely being changed in order to facilitate the interfitting of the two assemblies. Only one of the shift control assemblies will be described in detail, it being understood that the other assembly has corresponding elements, these corresponding elements being designated by primed numerals on the drawing.

The shift control assemblies are mounted on the chassis including the side members 11 and 13 such that they are exposed to road debris and to the elements in the winter time. Clearly, there is the danger of icing in winter and the freezing of the controls, and of the controls becoming so clogged with dirt that they become inoperative. It has been found that the area between the front and rear axles of a vehicle of this type is most subject to an accumulation of road dirt and icing conditions in the winter. In this area, as will become more clear, the shift control assemblies are enclosed, whereas in the area substantially forwardly of the front axle and rearwardly of the rear axle, the parts are not exposed to as much road dirt and the danger of freezing due to icing, so that these parts need not be enclosed.

The shift control assembly interconnecting the front arm 21 and the rear member 19 includes a forwardmost longitudinally extending link preferably comprising a bifurcated element 25 pivoted to the arm 21 and constituting in effect a clevis. Received in a nut in the other end of the clevis 25 and extending rearwardly approximately parallel to the side member 11 is a connector rod 27, the rear end of this rod in turn being screwed into another rearwardly facing clevis 29.

Figure 5:
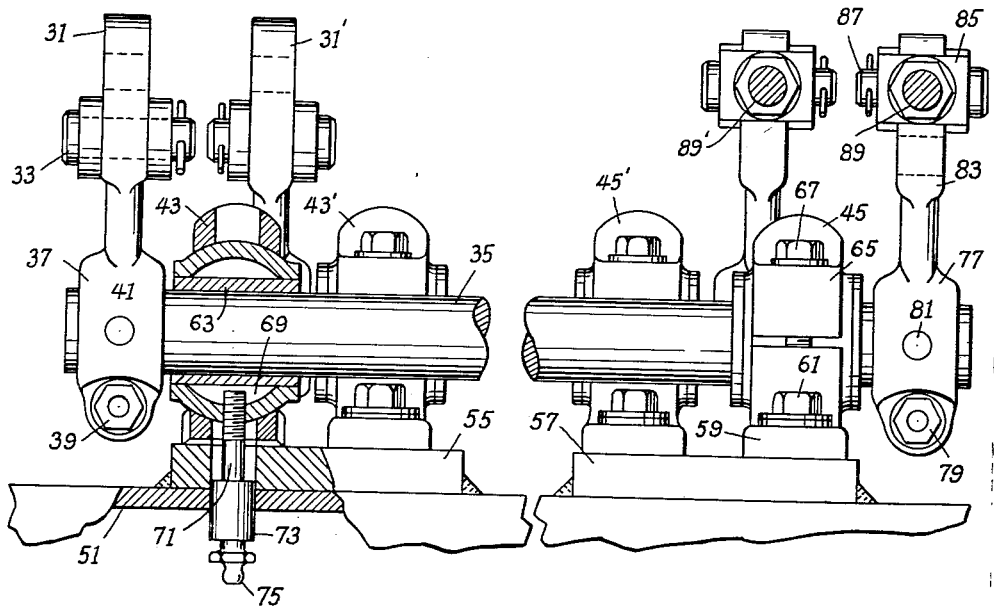
FIG. 5 is an enlarged section taken on line 5—5 of FIG. 1, one of the pillow bearings being shown in section also.

Referring also to FIGS. 4 and 5, the clevis 29 is pivoted to the upwardly extending end of a lever 31 as by means of a suitable yoke pin 33. The lower end of the lever 31 is positively connected to the end of a laterally extending shaft 35 in any appropriate manner such as by means of a split ring 37 having downwardly extending ears through which a bolt 39 extends so that the ring may be tightened onto the end of the shaft. As an additional securement and to prevent lost motion between the lever 31 and the shaft 35, a drive lock pin 41 extends through the split ring 37 into the end of the shaft 35. In this manner, it can be seen that actuating the arm 21 positively moves the lever 31 and the shaft 35 a corresponding angular amount.

The shaft 35 is preferably supported in stationary position by self-alining bearings in a pair of spaced pillow blocks 43 and 45. To mount the pillow blocks 43 and 45, a supporting framework is provided extending between the chassis side members 11 and 13. In the preferred arrangement, a pair of oppositely disposed angle members 47 and 49 are each fastened to one of the side members 11 and 13, and extending between these angle members 47 and 49 are a pair of longitudinally spaced angles 51 and 53. The pillow blocks 43 and 45 are mounted on a pair of spaced support plates 55 and 57 suitably welded or otherwise appropriately fixed to the top of the bars 51 and 53 at right angles thereto.

The pillow blocks 43 and 45 are identical, and are of conventional form, preferably of the adjustable type. Briefly, the pillow block 45 includes a lower member 59 secured as by bolts 61 to the plate 57 and having a half-cylindrical cavity in which is received a cylindrical bearing 63. An upper member 65 has a downwardly facing half-cylindrical cavity fitting over the top of the bearing 63, the upper member 65 being adjustably secured to the lower member 59 as by means of downwardly extending bolts 67. Each of these blocks has a grease cavity 69 for lubricating the bearing, grease being fed into the cavity through a pipe nipple 71 extending downwardly through an aperture in the support plate 55 and mounted in a pipe coupling 73 extending through the angle 51, the nipple 71 entering into communication with a grease fitting 75. As is readily apparent, grease fed into the fitting 75 passes upwardly through the nipple 71 into the cavity 69. The self-alining feature of the bearings in the pillow blocks 43 and 45 assures that there is no binding of the shaft 35.

The other end of the shaft 35, after passing through the pillow block 45, is secured to a split ring 77 similar to the previously described split ring 37, the ring being clamped in place tightly by means of a bolt 79 extending through downwardly directed ears, angular slipping between the split ring 77 and the shaft 35 being prevented by a drive lock pin 81. The split ring 77 constitutes a portion of a lever having an upwardly extending arm 83 to which is pivoted a clevis 85 as by means of a yoke pin assembly 87.

The clevis 85 is connected to a rod and tube assembly which extends rearwardly to be secured to another clevis 87 pivoted to a pivot assembly yet to be described, the rod and tube assembly together with the two clevises 85 and 87 constituting in effect a link. The rod and tube assembly includes a central solid shift rod 89 screwed at either end into the clevises 85 and 87, and an enclosing and protective tube 91 having a length somewhat shorter than that of the shift rod 89, but at least extending a short distance to the front of the front axle and to the rear of the rear axle. The tube 91 is closed at either end and the annulus between the shift rod 89 and tube 91 is filled with a special all-weather extra low temperature oil, the shift rod 89 being immersed in the oil to provide positive protection against dirt and water.

Figures 6, 7:
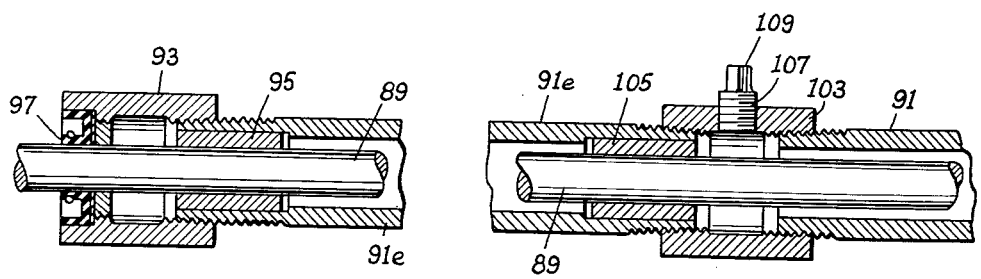
FIG. 6 is an enlarged sectional view taken on the line 6—6 of FIG. 2, the dust boot and clamp not being shown.
FIG. 7 is an enlarged sectional view taken on line 7—7 of FIG. 2.

To contain the oil within the tube 91, a coupling 93 is provided at either end, the two couplings being identical but reversed, in which are contained oil seals. The tube 91 is desirably made up in three sections including a central section and two end sections 91e. Referring to FIG. 6, the tube end section 91e has a threaded nipple at one end into which is pressed a bushing 95, preferably a bronze bushing, in which the shift rod 89 is received. The nipple on the tube section 91e is threaded into the coupling 93. In the coupling 93 is mounted an oil seal 97, the seal being preferably a spring loaded neoprene covered oil seal. It may be seen that the bushing 95 provides the dual function of supporting the shift rod 89 and also of eliminating deflective leads on the oil seal 97.

As will be more clear, the shift rod 89 has motion in and out of the coupling 93 and the oil seal 97. To protect the portion of the shift rod 89 which extends out of the coupling 93 and which may be moved through the oil seal 97, a dust boot 99 is clamped at one end to the outer surface of the end of the coupling 93 and engages the shift rod 89 at its other end. As best seen in FIGS. 2 and 4, the dust boot 99 is provided preferably by a rubber bellows clamped to the coupling 93 as by means of the ring clamp 101. The ring clamp 101 is of a conventional form which may be tightened circumferentially. The smaller end of the dust boot 99 has an aperture of a smaller diameter than the shift rod 89 so that there is a frictional fit. It is to be understood that the couplings 93 and the dust boots 99 at either end of the tube end sections 91e are identical but reversed. By this means, the portions of the shift rod 89 passing to and fro through the oil seals 97 are protected, thereby eliminating any abrasive action on the seals.

In order to admit oil into the annulus between the tube 91 and the shift rod 89, a pair of couplings 103 are provided, one at either end, joining the central section of tube 91 with the end sections 91e. Referring to FIG. 7, the tube end section 91e has a threaded nipple at its inner end which is threadedly received in one side of the coupling 103. A bushing 105 is pressed into the end of the tube section 91e, this bushing preferably being of bronze, the shift rod 89 being received in the bushing to be supported thereby in conjunction with the previously mentioned bushing in the other end of the tube and section 91e associated with the coupling 93. The threaded end of the central section of the tube 91 is received in the other end of the coupling 103. To admit oil into the annulus, an aperture or fill hole 107 is provided in the coupling 103, and a pipe plug 109 is removably received in this aperture. As is apparent, the tub 91 may be filled with oil by removing the plug 109 and pouring the oil through the aperture 107.

The oil to be used is an all-weather low temperature oil which does not freeze at the ambient temperatures encountered in the operation of the vehicle. It is further desirable that the oil not freeze at temperatures far below those usually encountered, such as one which will not freeze at 65 degrees below zero. The oil protects the shift rod 89 from road dirt and debris. Inasmuch as the oil seals 97 at each end of the tube assembly retain this oil, it is impossible for any condensate to enter the tube, thereby causing the rods to become inoperative due to freezing. The oil in the tube in addition to being used as a non-freezing agent, also serves as a lubricant and provides a means for deadening the sound of any motion of the rod.

The two rod and tube assemblies are desirably supported at one or more places midway between their ends. For this purpose, referring to FIGS. 1, 2, and 4, a pair of opposing plate supports 111 are secured to the chassis side members 11 and 13 for supporting a cross angle member 113. On the angle 113 is mounted an upstanding bracket 115 having a horizontally disposed leg to which are attached a pair of clamps 117. The rod and tube assemblies rest on the horizontal portion of the bracket 115 and are each engaged by one of the clamps 117. The effect is that the tube 91 with its end sections 91e are held clamped in place, while the shift rod 89 within them is free to shift longitudinally. Another cross support rearwardly of the rear axle is provided and is similar to the parts 111 to 117 just described, although the shape and dimensions are somewhat changed, as is evident by a comparison of FIG. 4 and FIG. 3. Corresponding elements having been given primed numerals, and since the similarity is evident, no further discussion is thought to be necessary.

As has been explained, the end of the shift rod 89 is connected to the clevis 87. The clevis 87 is pivoted on an upright pivot bar 119 pivoted at its lower end at 121 between a pair of upstanding ears or the like 123 carried by a cross bar 125. The cross bar 125 is supported by end blocks 127 carried by an appropriate portion of the vehicle chassis, here indicated generally at 129. Pivoted on the pivot bar 119 below the clevis 87 is one end of a link preferably comprising a rearwardly extending clevis 131 coupled by a short connecting rod 133 to another clevis 135. The clevis 135 is pivoted to the actuating member 19 of the transmission 15. In similar fashion, the other shift rod 89' is connected to a clevis 87' pivoted to a pivot bar 119' pivotally mounted on the cross bar 125 parallel to the bar 119. A clevis 131' pivoted on the pivot bar 119' below the clevis 87' is in turn connected to a clevis 135' which is pivoted on the actuating member 17 of the transmission 15. By this pivot assembly, it is seen that a push or pull on the shift rods 89 or 89' is transmitted to the transmission actuating members 19 or 17, which, it will be noted, are at a lower level.

In considering the operation of the transmission shift controls of the present invention, it will be recalled that the actuating arms 21 and 23 at the front end of the chassis are connected by a conventional arrangement with the driver operated gear shifting device provided on the vehicle, most commonly a gear stick. The two transmission shift control assemblies connecting the arm 21 with the transmission member 19 and the arm 23 with the member 17 are similar and have the same operation, so that a description of one assembly is sufficient. The gear shifting device exerts a push or a pull in a front to rear direction on either one or the other of the actuating arms 21 and 23. For instance, a pull exerted on the actuating arm 21 is transmitted to the link including the clevises 25 and 29 to pivot the lever 31. Due to the positive connection between the lever 31 and the shaft 35 provided by the drive lock pin 41, the shaft 35 is rotated by a corresponding angular amount. In a similar fashion, due to the positive connection between the lever 83 and the shaft 35, the lever 35 at the opposite end of the shaft 35 is pivoted by a like angular amount, and the clevis 85 has a movement corresponding to the movement of the clevis 29. The shaft 35 is mounted for rotation in self-alining bearings in two spaced pillow blocks 43 and 45 so that there is no binding in the shaft.

As the shift rod 89 is pulled forwardly with the clevis 85, it slides relative to the bushings 105 in the couplings 103 and the bushings 95 in the couplings 93. The tube 91, together with its end sections 91e, are held in a relatively stationary position by the clamps 117 and 117' carried by the respective support brackets 115 and 115'. The shift rod 89 also passes through the oil seals 97 in the two end couplings 93, the dust boot or bellows 99 at the rear end contracting while the bellows 99 at the front end is extended. At the rear end, the motion of the shift rod 89 is transmitted to the clevis 87, thus pivoting the pivot bar 119, and likewise drawing forward the link including the two end clevises 131 and 135, with the result that the actuating member 19 of the transmission 15 is likewise drawn forward.

The central portion of the shift rod 89, particularly that portion between the front and rear axles, the front axle being off to the left of FIG. 1 while the rear axle is off to the right of FIG. 2, is enclosed and protected by the tube 91 to prevent access of dirt and water. The annulus between the shift rod 89 and the tube 91 with its end sections 91e is filled with a special all-weather extra low temperature oil which will not freeze under the lowest ambient temperatures to be found in the use of the vehicle. In this critical area between the front and rear axle, where the effects of road dirt and icing conditions are most severe, the shift rod 89 is enclosed by the tube 91 and is immersed in a bath of oil. In addition to lubricating the rod, the oil serves to deaden the sound from any motion of the rod, and it is impossible for any condensate to enter the tube, which may cause the rods to become inoperative due to freezing. The oil may be renewed from time to time as is necessary through the fill holes 107 in the couplings 103 closed by the pipe plugs 109. The portions of the transmission shift controls forwardly of the front axle and rearwardly of the rear axle are not subject to the extreme effects of road debris and icing, so that it is not necessary to enclose this portion of the system. At the front end, the system of levers and the shaft journaled in the self-alining bearings in pillow blocks provide the correct alinement and positive motion desired without being specially protected.

The transmission shift controls according to the invention provide a positive action control which positively transmits the action of the gear shifting device manipulated by the driver to the transmission at the other end of the vehicle without substantial lost motion. The transmission shift control operates smoothly and efficiently, due to being immersed in its critical portions in an enclosed low temperature oil system, even under the severest winter conditions.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. The combination with a vehicle chassis having near one end a transmission of the type having two actuating members and two actuating arms near the other end of the chassis adapted to be separately manipulated by a gear changing device, of a pair of similar transmission shift control assemblies each interconnecting one of said actuating arms with its corresponding transmission actuating member, each of said assemblies including an elongated shift rod, a tube enclosing said shift rod for a substantial portion of its length corresponding at least to the distance between the front and rear axle, means at either end of said tube for mounting an oil seal for closing off the annulus between said shift rod and tube, means for admitting oil to said annulus, said oil being an all-weather low temperature oil which freezes only at temperatures below the ambient temperatures to which the vehicle is subjected, means for mounting said tube on said chassis so that said shift rod is movable within said tube, bushings mounted within said tube for guiding the movement of said shift rod, means for connecting one end of said shift rod with one of said transmission actuating members, a lever coupled with the other end of said shift rod, said lever being secured to the end of a shaft mounted for rotation in a pair of spaced pillow blocks, means for mounting said pillow blocks on the chassis, and another lever positively secured to the other end of said shaft and coupled with the corresponding actuating arm.

2. The combination with a vehicle chassis having a transmission near one end and at least one actuating arm near the other end adapted to be manipulated by a gear changing device, of a transmission shift control including a shift rod, a tube enclosing said shift rod for a substantial portion of its length, a coupling at each end of said tube having an oil seal for closing off the annulus between said tube and shift rod, means for admitting oil to said annulus, said oil being an all-weather low temperature oil which freezes only at temperatures below the ambient temperatures to which the vehicle is subjected, means for mounting said tube on the chassis, means for connecting one end of said shift rod with an actuating member carried by the transmission, and means for connecting the other end of said shift rod with the actuating arm adapted to be manipulated by the gear changing device, said last mentioned connecting means including a shaft, a pair of spaced adjustable pillow blocks mounting said shaft for rotation, means for supporting said pillow blocks on the chassis, levers fixed to either end of said shaft to rotate together, and coupling members for connecting one of said levers with said shift rod and the other of said levers with the actuating arm adapted to be manipulated by the gear changing device.

3. The combination with a vehicle chassis of the type having a transmission near one end and at least one actuating arm near the other end adapted to be manipulated by a gear changing device, of a transmission shift control including a shift rod, a tube enclosing said shift rod for a substantial portion of its length corresponding at least to the distance between the front and rear axles, a coupling at each end of said tube having an oil seal for closing off the annulus between said tube and shift rod, a pair of bushings at each end of said tube through which said shift rod passes, means for admitting oil to said annulus, said oil being an all-weather low temperature oil which freezes only at temperatures below the ambient temperatures to which the vehicle is subjected, means for mounting said tube in fixed position on said chassis so that said shift rod is movable within said tube, a pair of rubber bellows each clamped at one end to one of said couplings and extending away from its respective coupling, the other end of each of said bellows being frictionally engaged with said shift rod so that said bellows contract and expand as said shift rod moves relatives to said tube to protect the portions of said shift rod passing through said oil seals, means for connecting one end of said shift rod with an actuating member on the transmission, and means for connecting the other end of said shift rod with the actuating arm adapted to be manipulated by the gear changing device.

4. A transmission shift control assembly adapted for use with a vehicle chassis of the type having a transmission near one end and at least one actuating arm near the other end adapted to be manipulated by a gear changing device, said assembly including an elongated shift rod, a tube comprised of a central section and two end sections enclosing said shift rod for a substantial portion of its length corresponding at least to the distance between the front and rear axles of the vehicle chassis, bushings mounted at each end of each of said tube end sections through which said shift rod passes, a coupling at the outer end of each of said tube end sections having an oil seal for closing off the annulus between said shift rod and tube, other couplings between said tube end sections and central section each having a fill hole for admitting oil to said annulus, said oil being an all-weather low temperature oil which freezes only at temperatures below the ambient temperatures to which the vehicle is subjected, means connected to each of said first named couplings and engaging said shift rod for protecting the portion of said shift rod which passes through said oil seals, means connected to one end of said shift rod for adapting said shift rod to be connected to an actuating member on the transmission, and means connected to the other end of said shift rod and adapted to be connected to the actuating arm adapted to be manipulated by the gear shifting device.

5. A construction as defined in claim 4, wherein said means connected to the other end of said shift rod includes a shaft, a pair of adjustable pillow blocks for mounting said shaft for rotation, levers positively secured to said shaft at either end, one of said levers being coupled with the other end of said shift rod and the other of said levers being coupled with the actuating arm.

References Cited in the file of this patent

UNITED STATES PATENTS

| | | |
|---|---|---|
| 1,123,391 | Schlatter | Jan. 5, 1915 |
| 1,900,119 | Lysholm et al. | Mar. 7, 1933 |
| 2,188,403 | Frisby | Jan. 30, 1940 |
| 2,339,697 | Hey | Jan. 18, 1944 |
| 2,524,449 | Kellogg | Oct. 3, 1950 |